(12) United States Patent
Simmons

(10) Patent No.: US 9,754,466 B2
(45) Date of Patent: Sep. 5, 2017

(54) GUIDANCE INDICATOR AND SYSTEM FOR PROVIDING EGRESS ASSISTANCE

(71) Applicant: Michael Simmons, Haymarket, VA (US)

(72) Inventor: Michael Simmons, Haymarket, VA (US)

( * ) Notice: Subject to any disclaimer, the term of this patent is extended or adjusted under 35 U.S.C. 154(b) by 0 days.

(21) Appl. No.: 14/779,007

(22) PCT Filed: Mar. 14, 2014

(86) PCT No.: PCT/US2014/028752
§ 371 (c)(1),
(2) Date: Sep. 21, 2015

(87) PCT Pub. No.: WO2014/153027
PCT Pub. Date: Sep. 25, 2014

(65) Prior Publication Data
US 2016/0049053 A1    Feb. 18, 2016

Related U.S. Application Data

(60) Provisional application No. 61/803,238, filed on Mar. 19, 2013, provisional application No. 61/948,491, filed on Mar. 5, 2014.

(51) Int. Cl.
*G08B 7/06* (2006.01)
*G01C 21/20* (2006.01)
*G08B 25/12* (2006.01)

(52) U.S. Cl.
CPC ............ *G08B 7/066* (2013.01); *G01C 21/206* (2013.01); *G08B 7/062* (2013.01); *G08B 25/12* (2013.01)

(58) Field of Classification Search
CPC ......... G08B 7/062; G08B 7/066; F21S 9/022; G06C 90/20; G06C 90/205
See application file for complete search history.

(56) References Cited

U.S. PATENT DOCUMENTS

| | | | | |
|---|---|---|---|---|
| 7,061,392 B2* | 6/2006 | Hawkinson | ............ | G08B 7/066 340/326 |
| 7,255,454 B2* | 8/2007 | Peterson | ................. | F21S 8/032 362/147 |
| 7,619,538 B1* | 11/2009 | Zarian | .................... | G08B 7/062 340/326 |
| 2002/0149491 A1* | 10/2002 | Crandall, Jr. | .......... | G08B 7/066 340/691.1 |
| 2006/0071802 A1* | 4/2006 | Right | ....................... | G08B 3/10 340/628 |
| 2006/0261971 A1* | 11/2006 | Danvir | ................... | G08B 7/066 340/691.1 |
| 2011/0157486 A1* | 6/2011 | Murata | .................. | G08B 7/062 348/744 |
| 2011/0183644 A1* | 7/2011 | Gupta | .................... | G08B 7/066 455/404.2 |
| 2011/0241877 A1* | 10/2011 | Wedig | .................... | G08B 7/066 340/540 |

(Continued)

*Primary Examiner* — Andrew Bee
(74) *Attorney, Agent, or Firm* — Richard C. Litman

(57) ABSTRACT

A system, a device and a method for providing directional indication are provided. The system includes a detector (113) configured to sense a condition, a guidance indicator (117) configured to provide an indication regarding a path for egress, and a control unit configured to control the guidance indicator based on a signal from the detector.

18 Claims, 3 Drawing Sheets

(56) References Cited

U.S. PATENT DOCUMENTS

| | | | |
|---|---|---|---|
| 2011/0267179 A1* | 11/2011 | Patterson | G08B 7/066 340/286.02 |
| 2014/0340222 A1* | 11/2014 | Thornton | G08B 7/062 340/539.17 |
| 2016/0027266 A1* | 1/2016 | McDonagh | G08B 7/062 340/815.4 |
| 2016/0035194 A1* | 2/2016 | Palmeri | G01C 21/206 340/815.4 |

\* cited by examiner

GUIDANCE INDICATOR AND SYSTEM FOR PROVIDING EGRESS ASSISTANCE

CROSS-REFERENCE TO RELATED APPLICATION(S)

This application claims the benefit under 35 U.S.C. §119 (e) of a U.S. provisional patent application on Mar. 21, 2013 in the U.S. Patent and Trademark Office and assigned serial number 10-2013-0030276, the entire disclosure of which is hereby incorporated by reference.

BACKGROUND OF THE INVENTION

1. Field of the Invention

The present invention relates to devices, systems and methods for egress guidance.

2. Description of the Related Art

A typical residential or commercial building is provided with a detection and alarm system such that, when a dangerous situation such as a fire occurs, the system detects the fire and alerts occupants of the building with an alarm. In that regard, the alarm typically includes a ringing bell or other audible alarm along with a visual alarm such as a flashing light as general indicators to the occupants that it is necessary to exit the building. However, while the occupants may know that it is necessary to exit the building, they may not be aware of a route for egress out of the building, let alone the better of two or more routes for egress out of the building. For example, if the dangerous situation includes an excessive amount of smoke, it may be difficult for the occupants to see towards an exit. Also, if there are two or more exits, the occupants are not aware of which path of egress should be followed. For example, if there are exits on the north and east sides of the building and the dangerous condition has occurred on the north side, the occupants are not made aware that the best path of egress is towards the east side exit.

In such a situation, it would be advantageous to provide a device, a system and a method that intelligently provides illumination for guiding an occupant not only toward an exit or other safe point of egress but also away from a source of danger, such as a location at which a fire or other dangerous event has occurred. Moreover, if there is simply a loss of power to the building, it would be advantageous to provide a device, a system, and a method for illuminating and indicating a path that guides an occupant toward an exit. The present application includes several inventive concepts, examples of which are described below, to achieve these purposes.

The above information is presented as background information only to assist with an understanding of the present disclosure. No determination has been made, and no assertion is made, as to whether any of the above might be applicable as prior art with regard to the present invention.

BRIEF SUMMARY OF THE INVENTION

Aspects of the present invention are provided to address at least the above-mentioned problems and/or disadvantages and to provide at least the advantages described below. Accordingly, an aspect of the present invention is to provide an apparatus, a system, and a method for guiding an occupant of a building towards an exit.

Still another aspect of the present invention is to provide an apparatus, a system, and a method for guiding an occupant of a building towards an exit during a loss of normal power.

Yet another aspect of the present invention is to provide an apparatus, a system, and a method for guiding an occupant of a building towards an exit during an emergency.

Yet another aspect of the present invention is to provide an apparatus, a system, and a method for guiding an occupant away from a source of danger and towards an exit during an emergency.

Still another aspect of the present invention is to provide an apparatus, a system and a method for guiding an occupant through a building during an emergency.

In accordance with an aspect of the present invention, a system for providing direction indication is provided. The system includes a detector configured to sense a condition, a guidance indicator configured to provide an indication regarding a path for egress, and a control unit configured to control the guidance indicator based on a signal from the detector.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DESCRIPTION OF THE INVENTION

Figure 1:
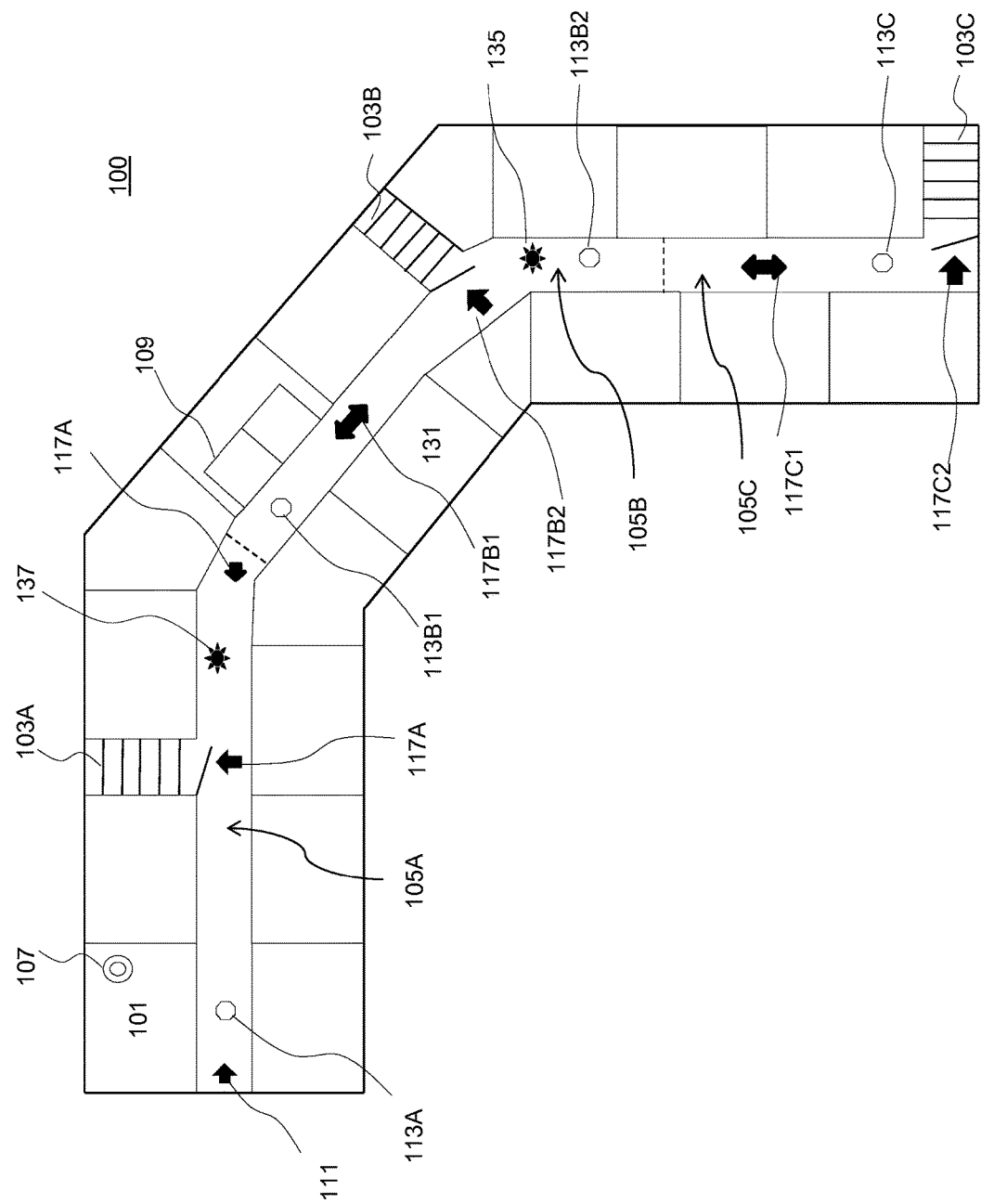
FIG. 1 illustrates an implementation of a guidance indicator system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by any appended claims and their equivalents.

It is to be understood that the singular forms "a," "an," and "the" include plural referents unless the context clearly dictates otherwise. Thus, for example, reference to "a component surface" includes reference to one or more of such surfaces.

As in the examples described below, embodiments of the present invention include an apparatus, a system, and a method for guiding an occupant of a building towards an exit.

In the following description, the term "building" includes any residential or commercial building, such as a house, a townhouse, an apartment including an apartment complex, a condominium, a hotel, a motel, an office building, a stadium, an arena, a civic center, a museum, a courthouse, a jail, a shopping mall, a movie theater, a government office, and the like, or any combination thereof.

The term "normal power" refers to a source of electricity that is used under typical or normal operating conditions of a building. It may also be considered a primary source of power, or a first source of power. An example of "normal power" includes electricity from an alternating current (ac) system that is provided from a source that is external to a building and routed through the building by means of wiring internal to the building, such as a 240/120 Vac or 208/120 Vac system or any related circuits, such as a branch circuit, commonly found in a typical home or office building. Power provided to a building by an electrical power company is an example of "normal power." Additionally, "normal power" may be any power that is generated, converted, transformed, inverted, rectified, or otherwise altered or produced either internally to or externally from a building. For example, if a building includes a 120 Vac branch circuit that is ultimately supplied power from an external source such as a power company, "normal power" may be power that is generated by rectifying the 120 Vac power into 12 Vdc power.

The term "emergency power" refers to a source of power that may be used to provide electricity to various components, such as those within a building, if normal power is not available. It may also be considered a secondary source of power, a second source of power, an alternate source of power, etc. In implementation, "emergency power" may include electricity from a direct current (dc) device or system as well as electricity from an ac system. Examples of "emergency power" include one or more batteries that are associated with an individual component (e.g., one or more of a 9 Vdc battery, a AAA cell battery, a AA cell battery, a C cell battery, etc.), a dc system in which a dc source (e.g., a battery, an associated charger, etc.) is provided remotely from an individual component and is wired for connection to one or more components, an emergency generator that provides either ac or dc power, is located remotely from an individual component and is wired for connection to one or more components, a solar powered system, an uninterruptible power supply, and the like. As an example, if "normal power" includes 12 Vdc power that is generated by rectifying a 120 Vac source of power, "emergency power" may also include 12 Vdc power that is supplied from a dc system including, for example, a battery, a charger, control circuitry, etc. In that case, the battery may be charged by the "normal power" during normal conditions and the 12 Vdc power can be supplied to remote components from either the normal power source or the emergency power source using the same wiring. Furthermore, "emergency power" may include a plurality of power sources, such as a first battery and a second battery, that may be configured in a variety of ways, such as automatically switching between the first battery and the second battery, user selection of the first battery or the second battery, and the like. Of course, these are merely examples and the "normal power" and the "emergency power" need not be configured exactly as described, for example the "normal power" and the "emergency power" need not be of the same voltage and/or of the same type (e.g., ac or dc).

The term "guidance indicator" includes any audio or visual source that provides an indication to a building occupant as to a path in the building. The term "guidance indicator" may include lighting that indicates to an occupant a path that should be followed, a path that should not be followed, a general indication of a state of emergency, an indication of a loss of normal power, an indication of an all-clear, an indication of a test, and the like. Examples of a "guidance indicator" may include lighting of any color such as red to indicate a path that should not be followed, green to indicate a path that should be followed, yellow to indicate a general state of emergency, white to indicate a loss of power, blue to indicate that an emergency has ended, any combination of the above, and the like. Of course, these are merely examples of different colors and different indications that may be combined and/or used and are not to be construed as limiting in that other colors, combinations, indications, and implementations may be used.

The term "guidance indicator" may include the illumination or projection of any word, wording, picture, or symbol to provide information or an indication to an occupant of a building. Examples include an arrow pointing in a specific direction, lighting configured to illuminate an "X" or a circle having an "X" therethrough, lighting that projects a word or wording such as "exit," "exit here," "danger," "no exit," and the like. Also, a "guidance indicator" may be lighting of a specific color in combination or conjunction with a word or an image, such as a green arrow, the word "danger" illuminated with red lighting, and the like. Also, a "guidance indicator" may include lighting that changes its appearance or color to provide an indication to an occupant, such as a series of lights that illuminate in sequence to convey a path that an occupant should follow, lights that flash at different frequencies depending on their proximity to a safe or unsafe location or exit, a light in combination or conjunction with a word or wording that flashes or strobes to convey a path that an occupant should not follow, and the like. Again, these are merely examples and are not to be construed as limiting.

The term "guidance indicator" may include an apparatus or device that able to provide a first indication to a first occupant and a second indication to a second occupant, wherein the first and second indication may or may not be the same. For example, the guidance indicator may include an apparatus or device having a first side and a second side, wherein, depending on the location of the guidance indicator in relation to the location of a dangerous condition, the first side may indicate a path to follow, while the second side indicates a path that should be avoided. For example, a "guidance indicator" may be implemented as an exit sign. In that case, during a normal or non-emergency condition, the exit sign may be illuminated with the word "EXIT" on both a first side and a second side. In the event the exit sign is located in the middle of a north-south hallway and a dangerous condition occurs at a north side of the hallway, the exit sign may change its appearance so as to illuminate or otherwise display an indication of a safe path to an occupant on the north side of the hallway while illuminating or otherwise displaying an indication of a dangerous path to an occupant on the south side of the hallway. That is, the same exit sign will provide an indication so as to discourage an occupant from heading towards the north side of the hallway while simultaneously providing an indication to an occupant to move towards the south side of the hallway. Of course, the exit sign is merely an example and it is to be understood that the guidance indicator may be implemented in any of various forms.

The "guidance indicator" may also include an audio apparatus, system, or device that provides an indication as to a path or a location in a building. For example, the guidance indicator may include one or more speaker that creates a series of tones or sounds, such as tones of a progressively higher or lower frequency, tones of a progressively higher volume, or a tone that is output at a different rate depending on the proximity of the guidance light to a safe or unsafe location or exit, that guide an occupant towards an exit or away from a source of danger. Alternatively, the guidance indicator may provide a first sound corresponding to a path or point of exit that is preferred, and provide a second sound, distinct from the first sound, corresponding to a path or point of exit that is not preferred. For example, the first sound corresponding to a preferred point of exit may include a soothing sound (e.g., a chime) while the second sound corresponding to an undesired path may include a displeasing sound (e.g., screeching). As another example, the guidance indicator may provide an audio instruction regarding a path of egress or an undesired path using one or more word such as "EXIT," "EXIT HERE," "EXIT AHEAD," "NO EXIT," and the like.

In implementation, the audio apparatus or device may be configured with or integral to another device, such as a visual device/apparatus (e.g., an exit sign), wherein both the audio apparatus/device and visual apparatus/device function as part of the same guidance indicator system. In that case, each audio apparatus/device may be individually controlled regarding its volume, type of sound, frequency, timing, and the like in order to coordinate with another audio apparatus/device to indicate a desired path or a dangerous path. Also, both the audio device/apparatus and the visual device/apparatus may be controlled together. For example, both the audio device/apparatus and the visual device/apparatus may be correspondingly set in relation to other audio and visual devices/apparatuses. As a general example, a parameter of an audio/visual device/apparatus may be set to a level N, where an audio/visual device/apparatus closer to a dangerous condition may be set to N−1, while an audio/visual device/apparatus further from the dangerous condition may be set to N+1. Here, N may refer to a volume, frequency, phase, timing, intensity, and the like of either the audio or visual device/apparatus. In another embodiment, the guidance indicator system may include a motion or other sensor that detects the approach of an occupant. Upon detection by the sensor, a guidance indicator device or apparatus may function to output any of the above or below described audio or visual effects.

In implementation, a "guidance indicator" may be configured and/or installed so as to illuminate on any surface or may be installed in combination/conjunction with any surface such as a wall, a ceiling, a floor, a stairwell, a window, a door, a doorknob, a door jamb, a floorboard, a ceiling tile, a chair rail, and the like. For example, a "guidance indicator" may be projected by a separate device so as to illuminate on a ceiling, or may be integral to a part of the ceiling such as a ceiling tile. Similarly, a "guidance indicator" may be installed as a separate device to illuminate on a door or may be an integral part of a door component such as a door frame, a door knob, and the like.

In implementation, a "guidance indicator" may include components that are installed separately from other components, may be installed/configured integral with other components that are installed in a building and may be attachable/detachable to/from other components that are installed in a building. For example, a "guidance indicator" may be integrated into a device such as an alarm or detector device (e.g., a smoke detector, a fire detector, a carbon monoxide detector, etc.). As another example, a "guidance indicator" may be installed on a top, bottom, front, back, or side of a device, may be installed on a mounting bracket of a device, may be attachable/detachable to/from a device, and the like. As a specific example, a "guidance indicator" may be integrated as part of an "exit" sign. In that case, the exit sign may not only provide its typical indication of a point of exit during a normal condition in a building, but may further function to provide an illumination regarding a path during an emergency, a loss of power, a test, and the like. That is, the "exit" sign may be configured to be extinguished, change color, change wording, or otherwise function in a specific manner depending on whether the exit with which it is associated is a safe exit based on certain conditions such as a dangerous condition. Additionally, the exit sign may include a "guidance indicator" as a component thereof, such as designated lighting combined with the exit sign, that functions in conjunction with the exit sign without altering the original purpose of the exit sign itself. As still another example, a "guidance indicator" may be implemented as a device that is not combined or used in conjunction with another device. In that case, a "guidance indicator" may include a device, system or component that functions only as a means of providing an indication to a building occupant as to a path in the building.

In implementation, the "guidance indicator" of the present invention may be used to function in combination or conjunction with a smoke detector, a fire detector, a carbon monoxide detector, a loss of power detector, or a detector of any other type of condition. Similarly, the "guidance indicator" may function in combination or conjunction with a Public Address (PA) system, or any other system implemented in a building. That is, the present invention may be implemented with a system and/or device so as to provide the original function of the system/device but also to further function as a guidance device. As an example, the "guidance indicator" may be configured to operate in conjunction with a fire alarm system such that, when a fire is detected or the fire alarm system is otherwise alerted or activated, the "guidance indicator" will illuminate, annunciate, or otherwise function to provide a path for an occupant of the building. In that regard, the "guidance indicator" may be configured to receive a signal from the detection system.

In implementation, the "guidance indicator" may be installed as a single component or as a plurality of components. If installed as a plurality of components, each component may be configured to communicate with other "guidance indicator" components and/or may be configured to communicate with other components that are not part of the "guidance indicator." Further, such communication can be by means of a wired and/or a wireless connection. Such communications may include the provision of one or more signals, such as a control signal and/or an indication signal, and/or the provision of power, such as the provision of normal power and/or the provision of emergency power.

Generally, the energizing of a guidance indicator can be achieved in a variety of ways in consideration of the manner in which it is implemented. More specifically, a guidance indicator can be provided power from either or both normal power and emergency power or from only one of normal power and emergency power. For example, if a guidance indicator is implemented as part of an exit sign, the exit sign may be provided both normal power and emergency power, wherein, when available, the normal power is used to control and energize both a normal function of the exit sign (e.g., illuminating the word "exit" during a normal condition) and to energize the guidance indicator (e.g., illuminate colored lights to provide an indication as to a path for egress). Alternatively, if the normal power is unavailable, both the normal and the guidance indicator functions of the exit sign may be energized by the emergency power. As yet another alternative, if the normal power is unavailable, only the guidance indicator functions of the exit sign may be energized by the emergency power. Still further, regardless of whether the normal power is available, all functions of the exit sign may be energized by the emergency power in the event of a dangerous condition, or only the guidance indicator functions may be energized by the emergency power in the event of a dangerous condition. In other words, any of the functions and components of the exit sign may be provided power from either the normal power and/or the emergency power.

The guidance indicator may be implemented using one or more of a Light Emitting Diode (LED), a fluorescent light, an incandescent light, a halogen light, a High Intensity Discharge (HID) light, an infrared light, or any similar or new type of lighting. The guidance indicator may include any number, color, size, intensity (e.g., lumens), rating, etc. of bulbs, LEDs, and the like. Moreover, the guidance indicator may be implemented using a low power laser or other source of illumination having an intensity, rating, color, etc. so as to be seen through smoke, fire, etc. to ensure its visibility during an emergency.

An aspect of the invention is to provide a guidance indicator that activates during an emergency or other condition in which it is necessary or useful to provide an indication to occupants of a building as to a path out of the building, or a path that should be avoided. In implementation, and as will be explained using several examples below, the guidance indicator may be installed so as to activate under any of various conditions. For example, the guidance indicator may be implemented so as to activate upon a loss of normal power, upon occurrence of an emergency condition, upon occurrence of a test of the system, upon control by an occupant of the building, upon control by a remote operator, and the like. Furthermore, the guidance indicator may be implemented so as to provide a set indication of a path towards one or more exits, may be implemented so as to provide a variable indication of a path towards an exit depending on conditions within the building, may be implemented so as to be controlled remotely including remote control of the indications provided by the guidance indicator, and the like. Various exemplary implementations of the present invention are described below.

Exemplary Implementations

In a first example of the invention, it is assumed that a plurality of guidance indicator devices are installed and function as a guidance indicator system. It is further assumed that the guidance indicator system is installed so as to receive an indication of a loss of normal power and/or an indication of a dangerous condition from a detection system, such as a fire detection/alarm system.

In a first configuration, when receiving an indication of an emergency condition or a loss of normal power event, the guidance indicator system can provide a set indication for egress. For example, if a component of the guidance indicator system is mounted on a south wall of a building, and there are exits on the east and north sides of the building, the component can illuminate or otherwise provide guidance towards the east and north exits. In that case, during an emergency or loss of power event, the component of the guidance indicator system may provide an indication such as an illumination of a specific color, projection of a word, wording, picture or an image, or otherwise provide an indication directing an occupant towards the east and north exits. As an example, the indication may include a green directional light, such as a laser, that points towards an exit. In this configuration, the indication provided by the guidance indicator system is considered set as it illuminates or otherwise indicates known paths towards known exits without consideration of a dangerous condition. Furthermore, in such a condition, various components of the guidance indicator may also provide general illumination without providing a direction. For example, if a general emergency condition or loss of normal power is detected, a guidance indicator may simply illuminate the general area in which it is located. As a more specific example, an exit sign may be provided not only with the word "EXIT," which continuously illuminates during normal conditions, but be further configured so as to provide general or ambient lighting such that the location in which the exit sign is located is not dark. In an exemplary embodiment, the exit sign may be provided with LEDs as a guidance indicator that illuminate a general white color upon loss of normal power. The LEDs may be provided as an integral part of the exit sign, may be provided proximate or coupled to the exit sign, or may otherwise be provided as part of the exit sign. In any case, the LEDs as a guidance indicator may be provided emergency power so as to be able to illuminate upon a loss of normal power. The emergency power may be supplied from a battery that also provides power to the exit sign such that the word "EXIT" will also illuminate upon a loss of normal power. Alternatively, the emergency power may be supplied from a battery that only provides power to the LEDs of the guidance indicator. As described above, the emergency power may be any ac or dc power source, and may be located at the guidance indicator or remotely from the guidance indicator.

In another implementation, the building may have a plurality of detectors mounted therein, such as a plurality of smoke/fire detectors. In that case, each of the detectors may be provided with a guidance indicator component that provides an indication towards an exit. During an emergency condition, the guidance indicator associated with each detector provides an indication towards an exit. Again, if a building has exits on the east and north sides, each detector may provide an indication towards one or both exits, depending on the configuration of the building relative to the location at which the detector is mounted. For example, if the detector is mounted on the south end of a north-south hallway, the directional indication will provide guidance towards the north whereas if the detector is mounted near or in a corner of a hallway, the detector may provide guidance towards both the east and north exits, depending on the specific arrangement of the corner and the hallway. Again, in this example, the indication provided by the guidance indicator is set in that it illuminates or otherwise indicates known paths towards known exits without consideration of dangerous conditions.

In another implementation, the guidance indicator may be implemented as a smart system that provides an indication of a path within a building in consideration of conditions within the building. In implementation, the guidance indicator may receive one or more signals so as to determine which indication to provide.

For example, in a building having an exit on the north side and having an exit on the east side, the detection system may detect a dangerous condition at or near the east side exit. In that case, the guidance indicator may be configured to receive an indication of the danger at or near the east side exit and provide an indication of a path toward the north side exit. Moreover, the guidance indicator may be configured to indicate that any path towards the east side exit should not be followed. For example, the guidance indicator may illuminate a path towards the north side exit using green arrows projected on the floor and indicate that a path towards the east side exit should not be taken by projecting a red "X" or by projecting the words "NO EXIT" on the floor. Again, these are merely examples and the guidance indicator may be implemented in any of a variety of ways as described above.

In determining which path an occupant should or should not follow, the guidance indicator may be configured in conjunction with the detection system so as to receive signals relating to a dangerous condition. For example, if the detection system is a smoke detection system and a detector of the smoke detection system determines or otherwise senses that smoke is present, the guidance indicator system may receive a signal or other indication that the detector has determined that smoke is present. Based on the location of the detector that has made such a determination, the guidance indicator will alter the indications it provides so as to indicate a safe or unsafe path. For example, if the smoke detection system is located in a building having a north side exit and an east side exit, when a smoke detector on the east side of the building detects smoke, the guidance indicator will indicate that an occupant should follow a path towards the north side exit and avoid a path towards the east side exit.

As yet another example of implementing the present invention, the guidance indicator may provide not only a two-dimensional indication of a path to follow and a path not to follow (e.g., north, south, east, and west directions,) but may be implemented to provide a three-dimensional indication (e.g., up, down directions). For example, in a building having more than one story or floor, a dangerous condition may exist in different locations on different floors such as a fire on the north side of the $8^{th}$ floor and a fire on the south side of the $4^{th}$ floor of a 10 story building. In that case, the guidance indicator may receive an indication regarding the locations of both fires and provide an indication as to paths that should or should not be followed on each floor. For example, the guidance indicator may indicate a path towards a stairwell on the south side of the building for occupants of the $6^{th}$ through $10^{th}$ floors and a path towards a stairwell on the north side of the building for occupants on the $1^{st}$ through $5^{th}$ floors. In that case, the guidance indicator may provide various indications as to a path to take or not to take in the hallways of the building, but may also provide an indication within one or more of the stairwells. For example, within the southern stairwell on the $6^{th}$ through $10^{th}$ floors, the guidance indicator may indicate that an occupant should not exit the stairwell by illuminating a red indication on the doorknob, a red "X" on the door, or similar indication that an occupant should not exit the stairwell on those floors. Within the same southern stairwell, the guidance indicator may indicate that an occupant should exit the stairwell on the $5^{th}$ floor by illuminating a green indication on the doorknob, a green "Exit Here" on the door, or other indication leading an occupant out of the stairwell on that floor. Once out of the stairwell on that floor, the guidance indicator would then provide an indication that the occupant should proceed towards the northern stairwell.

In another exemplary implementation, if a guidance indicator system is provided in a building and a detection system such as a fire detection system is alarmed by means of an occupant activating a pull station, the guidance indicator system may provide an indication of a general state of emergency concurrently with an indication of a path towards an exit. For example, if a pull station is activated to set off the detection system but a detector of the detection system has not sensed a dangerous condition, it is not known in which direction an occupant should exit the building. In that case, the guidance indicator may provide an indication towards all exits of the building but also indicate a general state of emergency. For example, the guidance indicator may provide an indication towards an exit using an arrow illuminated with a yellow light, or provide wording such as "Exit With Caution," and the like. In such a condition, if the detection system is later made aware of a location of danger, such as by a detector of the system detecting a dangerous condition at a specific location of the building, the guidance indicator can be provided with an indication of the location of the dangerous condition and provide an indication of a path away from that location and towards an exit.

Furthermore, if there exists a situation in which a detection system detects that dangerous conditions exist in locations near all exits of a building, the guidance indicator may be provided an indication of such a condition and again provide an indication of a general state of emergency while providing an indication towards all of the exits. That is, if there is not a preferred path out of the building, the guidance indicator may again provide an indication towards an exit using an arrow illuminated with a yellow light, or provide wording such as "Exit With Caution," and the like.

As another exemplary implementation, a guidance indicator may be implemented in a building in conjunction with a detection system that has an annunciator panel as part of a fire detection/suppression system, or the like. In that case, the guidance indicator may be configured either integral with, or otherwise able to be controlled by the annunciator panel such that an operator of the annunciator panel may override or otherwise control any indication provided by the guidance indicator. For example, in a situation in which the guidance indicator is provided with a signal that a dangerous condition exists near both of two exits in a building, the guidance indicator may be indicating a general emergency condition along with paths towards the exits. That is, as described above, the guidance indicator may provide an indication towards both exits using an arrow illuminated with a yellow light, or provide wording such as "Exit With Caution," and the like. In that case, an operator of the annunciator panel may be aware that, while the detection system has detected dangerous conditions near both exits of the building, one location or condition is much worse than the other, such that the guidance indicator should be directing occupants towards the less dangerous exit. As such, the guidance indicator may be configured to be manually controlled by the operator of the annunciator panel so as to provide an indication towards the preferred exit. Moreover, the guidance indicator may be provided with a separate control panel so as to provide the above and similar functions. In either case, the annunciator or control panel may also be controlled remotely by means of a wireless connection, such as by a smart phone, a dedicated wireless device, and the like. In that case, the control panel of the guidance indicator system may include a Radio Frequency (RF) transceiver to communicate with an external device and may provide any necessary information to the external device for external control, such as a layout of the building including locations of exits, locations of detectors, indications of detectors that have sensed a dangerous condition, locations of guidance indicator devices that may be externally controlled, and the like.

As another example, an emergency condition may exist in which external control or activation of the guidance indicator is necessary. For example, in the event that an assailant enters a building, it may be necessary to direct occupants towards a safe exit and away from the assailant. In that case, the guidance indicator may be used to indicate a desired path of egress as well as a path that an occupant should not take. Using an annunciator panel or other controller, an operator would be able to control the guidance indicator to function as described above to assist in directing occupants away from the assailant and towards a safe exit. In an embodiment, the annunciator panel or controller may be configured to allow remote control of the guidance indicator. Alternatively, if the guidance indicator is not configured in conjunction with an annunciator panel or other controller, the guidance indicator system in itself may be remotely controlled. Additionally, the guidance indicator may be configured in conjunction with or have a PA system such that an operator may provide additional guidance, directions, and the like over a loud speaker system. As yet another example, as described above, the guidance indicator includes audio indication which is provided by a speaker included in a guidance indicator device or an associated device. As such, the speakers of the guidance indicator devices may be used by an operator to provide instructions regarding guidance, directions, etc.

In another exemplary implementation, a guidance indicator may be provided in conjunction with a detection system such that, for example, a guidance indicator is provided as an integral part of a detector, such as a smoke detector. As is known in the art, a single smoke detector is typically installed as one of a plurality of smoke detectors that are provided normal power (e.g., from a branch circuit of a building) and are provided emergency power (e.g., from a battery internal to the smoke detector). Furthermore, each smoke detector typically includes indication/control wiring that provides a source of communication between the detectors. In that case, if one of the detectors senses a dangerous condition, it not only provides an alarm itself but also provides a signal to the other detectors such that they also provide an alarm. By configuring a guidance indicator in conjunction with such a detector, the guidance indicator may provide a path away from the source of danger using the existing wiring of the detection system. For example, the guidance indicator may be configured such that it provides a path away from the detector that sensed the alarm. In that case, the guidance indicator in conjunction with the detector may be designated as having a specific location. That is, a detector may be designated as a north detector, an east detector, etc. such that, when a 'south' detector detects a dangerous condition, the guidance indicator associated with the detectors is made aware of the location of the danger in relation to its location and provides an appropriate indication. In implementation, the detector and/or guidance indicator device may have various means by which to designate its position. For example, a detector may have one or more of a toggle switch, a dip switch, a push button, a connector, wiring, etc. that can be changed in correspondence with the location of the detector/guidance indicator. Also, the detector/guidance indicator device can include an indication of its position, such as a window on each compass point of the device wherein a flag appears in the window corresponding with the designated position of the device, an LED indicating the same, and the like.

In still another implementation of the invention, the guidance indicator may be installed in conjunction with a detection system as described above and be further provided with additional wiring so as to provide control/indication signals to and from each device. In that case, each device may be provided with information as to a location of a dangerous condition and information as to what type of indication to provide regarding a path towards an exit. In another implementation, the guidance indicator may be provided with a means (e.g., RF transceiver, Bluetooth transceiver, Near Field Communication (NFC) transceiver, etc.) for wireless communication between each device.

Furthermore, if implemented in conjunction with a detection system, the guidance indicator may be provided a source of emergency power from a device of the detection system. For example, if a smoke detector is configured having guidance indicator, the guidance indicator may provide an indication using the source of emergency power provided to the smoke detector. Typically, the guidance indicator will be implemented using an LED such that the additional power requirements will be minimal. Alternatively, and as described above, the emergency power provided to the guidance indicator may be a separate battery located with each device, or may be a centrally located source of ac or dc power that is provided to each device. If a guidance indicator is installed as a backfit, each device may be provided power using a battery, depending on the cost of providing wiring for a centrally located emergency power source. On the other hand, if a guidance indicator is provided as part of a new installation, the cost of additional wiring will be negligible as an addition to the existing costs of wiring the building.

In another embodiment, the guidance indicator further includes directional indication that may be located away from a detector but used in concert and conjunction with the detector.

FIG. 1 illustrates an implementation of a guidance indicator system according to an exemplary embodiment of the present invention.

Referring to FIG. 1, a guidance indicator system is shown implemented in a floor 100 of a building, such as a hotel. As illustrated in FIG. 1, the floor 100 includes a plurality of rooms 101 including what is assumed to be an occupied room 131, a plurality of stairwells 103A, 103B, and 103C, a plurality of hallways 105A, 105B, and 105C, and elevators 109. In the embodiment of FIG. 1, the floor 100 is divided into three zones as indicated by the reference subscripts A, B and C (e.g., hallways 105A, 105B and 105C), where each zone corresponds to a stairwell 103A, 103B, and 103C, respectively. In the illustration of FIG. 1, zones A, B and C are separated by dashed lines. Of course, this is merely an example and there may be more or fewer zones. Furthermore, each zone may be considered as comprising multiple zones (e.g., zone A may include zones A1 and A2). Also, while the zones are described as corresponding to a stairwell, this too is merely an example and it should be understood that a floor, or any part of a building, may be zoned in many different ways, depending on the particular aspects of the building.

Room 101 is illustrated having a guidance indicator 107 installed therein. As described above, the guidance indicator 107 may be installed as a separate component and mounted on a wall, a ceiling, or any surface of the room 101, may be provided as an integral part of a component of the room 101, such as an integral part of a ceiling tile, door, etc., provided as a component of a detector (e.g., smoke detector), and the like. In an embodiment, the guidance indicator 107 may be configured to illuminate upon a loss of normal power, upon an emergency or dangerous condition, upon a test condition, upon selection by a user, and the like. The guidance indicator 107 may function to provide ambient illumination (e.g., white light) upon any of the above conditions, may function to provide guidance (e.g., green directional light) towards an entry/exit door associated with room 101, and the like.

As also illustrated in FIG. 1, zone A hallway 105A may include general guidance indicator 111. In implementation, the general guidance indicator 111 may be provided to activate upon a loss of normal power, upon detection of a dangerous condition, upon a test condition, and the like. As described above, the general guidance indicator 111 may illuminate or otherwise provide a set indication as to a path for egress. In the embodiment of FIG. 1, the general guidance indicator 111 is installed to illuminate a path towards the stairway 103A. For example, the general guidance indicator 111 may be installed to provide a white light such that a door of the stairway 103A is illuminated, to provide a series of lights that sequentially illuminate towards the stairway 103A, to provide a green light shining towards the stairway 103A, to illuminate an arrow towards the stairway 103A, to project a symbol, a picture, a word or wording that indicates a path towards the stairway 103A, and the like.

Hallways 105A, 105B, and 105C are respectively provided with detectors 113A, 113B and 113C. For purposes of explanation, zone B is illustrated having two detectors 113B1 and 113B2. Each of the detectors 113A, 113B1, 113B2, and 113C may be any of a smoke detector, a fire detector, a carbon monoxide detector, and the like. Furthermore, hallways 105A, 105B and 105C are respectively provided with zoned guidance indicators 117A, 117B1, 117B2, 117C1, and 117C2. As described above, zoned guidance indicators 117A, 117B1, 117B2, 117C1, and 117C2 may be implemented in any of a variety of forms to provide a function of guiding an occupant away from a dangerous condition and towards a preferred path for egress.

As an example, a dangerous condition 135 may exist in zone B of floor 100. In that case, the zone B detector 113B2 may detect the dangerous condition and provide an input to a control unit (not shown) of the guidance indicator system. Having received an input that the dangerous condition 135 exists in zone B, the guidance indicator system controls such that the zone A guidance indicator 117A and the zone C guidance indicators 117C1 and 117C2 provide an indication regarding a path for egress. As an example, the zone A guidance indicator 117A and the zone C guidance indicators 117C1 and 117C2 may include lighting that flashes green, such as an exit sign that includes LEDs or other bulbs that flash green, lighting around or on a door that flashes green or illuminates wording such as "EXIT HERE," an audio indication, or other indication as described above. Furthermore, based on the input from the detector 113B2 and the input from the detector 113B1 indicating that the dangerous condition 135 is near the detector 113B2 and not the detector 113B1, the control unit may cause guidance indicator 117B1 to direct an occupant towards zone A and away from zone C.

As an example, the guidance indicator 117B1 may include an apparatus such as an exit sign having a front side and a back side. In that case, assuming the front side faces towards zone C, the front side may illuminate with green lights or wording such as "EXIT HERE" or otherwise indicate to an occupant that a preferred path of egress is towards zone A. On the other hand, assuming the back side faces towards zone A, the back side may illuminate with red lights or wording such as "NO EXIT" or otherwise indicate to an occupant that a path towards zone C is not preferred. In that case, an occupant of room 131, upon exiting the room 131, would be made aware of which path of egress is preferred given the location of the dangerous condition 135.

The guidance indicator 117B2, being located near the dangerous condition 135, may be controlled to direct an occupant away from that area. For example, the guidance indicator 117B2 may illuminate with red flashing lights, with wording such as "NO EXIT," or, if the guidance indicator 117B2 is provided as an exit sign that illuminates the word "EXIT" under normal conditions, may be extinguished, and the like.

Similarly, given the location of the dangerous condition 135, zone C guidance indicator 117C1 may be configured using an exit sign having two sides in which a first side that faces zone B may illuminate with green flashing lights and a second side that faces zone C may illuminate with red flashing lights. Under the same conditions, zone C guidance indicator 117C2 may illuminate with green flashing lights, with an arrow pointing towards the stairs, with an audio indication that an exit point is near, and the like.

Based on the above assumption that the dangerous condition 135 has occurred, it may further be assumed that a second dangerous condition 137 occurs. In that case, the control unit of the guidance indicator system for floor 100 may alter any or all of the guidance indicator devices 107, 111, 117A, 117B1, 117B2, 117C1, and 117C2 to reflect the occurrence and location of the second dangerous condition 137. For example, the zone B guidance indicator 117B1 may be changed to indicate that both the path for egress towards zone A and the path for egress towards zone C should be followed with caution. For example, the zone B guidance indicator 117B1 may illuminate a yellow flashing light, or, if implemented as a two sided exit sign as described above, both sides of the exit sign may illuminate wording such as "EXIT WITH CAUTION," and the like.

Still further, in the event that either or both of the dangerous condition 135 and the second dangerous condition 137 no longer exists or is otherwise cleared, the guidance indicator system may again alter any or all of the guidance indicator devices 107, 111, 117A, 117B1, 117B2, 117C1, and 117C2 to reflect the clearing of the dangerous condition. For example, if the dangerous condition 135 is cleared while the second dangerous condition 137 still exists, the guidance indicator system may be re-configured to direct an occupant away from zone A, and towards zones B and C, or otherwise away from the location of the second dangerous condition 137.

Of course, FIG. 1 and its corresponding description is provided merely as an example of a guidance indicator system including its various components. Accordingly, it is to be understood that a guidance indicator system may be implemented in any of a variety of forms including any number of zones, any number and types of guidance indicator, any number and type of detectors, and the like.

In determining how many zones a building should include, various conditions should be considered. For example, a floor may be divided into a number of zones corresponding to the number of stairwells. Additionally, in a building having a plurality of floors, each floor may be considered a separate zone. Each zone may be determined based on a distance to a stairwell, based on the potential number of occupants in the zone during an emergency (e.g., density), based on capacity of a stairwell, based on a fire rating of the zone, and the like.

Figure 2:
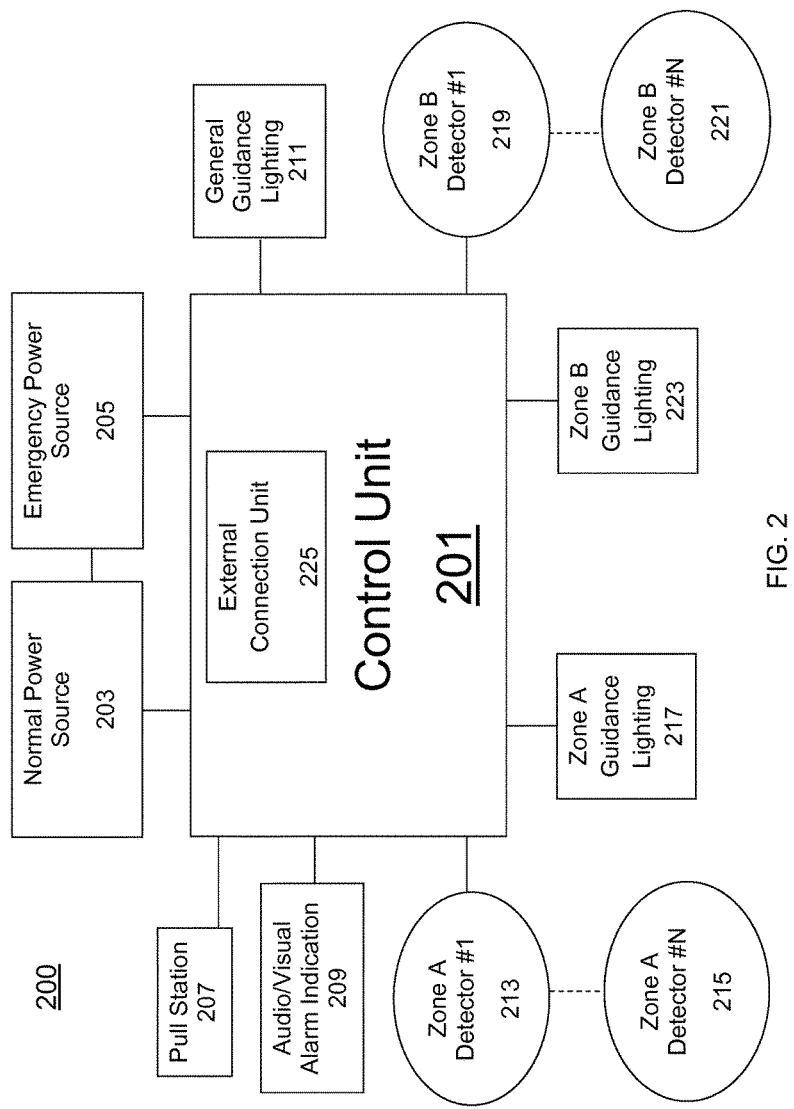
FIG. 2 is a block diagram illustrating a configuration of a guidance indicator system according to an exemplary embodiment of the present invention.

FIG. 2 is a block diagram of a guidance indicator system according to an exemplary embodiment of the present invention.

Referring to FIG. 2, a guidance indicator system 200 may include a control unit 201, a normal source of power 203, an emergency source of power 205, a pull station 207, an audio/visual alarm indication 209, general guidance indicator 211, a zone A detector #1 213, a zone A detector #N 215, zone A guidance indicator 217, a zone B detector #1 219, a zone B detector #N 221, and zone B guidance indicator 223. Of course, the guidance indicator system 200 illustrated in FIG. 2 may include more or fewer components, parts, devices, and the like than what is shown.

The control unit 201 controls the overall operation of the guidance indicator system 200. For example, the control unit 201 receives signals from components of the guidance indicator system 200 and provides signals to the same or other components of the guidance indicator system 200. In an exemplary embodiment, the control unit 201 may include an external connection unit 225 to provide a variety of functions and connections. For example, the external connection unit 225 may include an RF or other type of transceiver (e.g., Bluetooth, Zigbee, NFC, etc.) to wirelessly connect to an external device, such as a smart phone or other type of controller. In that case, the transceiver may provide various types of information to the external device including a layout of the building in which the guidance indicator system is located, a status of the control unit, a status of any of the various components such as the detectors, guidance indicators, power sources, etc. Also, the transceiver may receive a signal or other control from the external device so as selectively activate, deactivate, etc. any of the detectors, guidance indicators, alarm indicators, etc. Additionally, the external connection 225 may include a wired or wireless connection to an annunciator or similar panel, for example an annunciator panel located in the building in which the control unit 201 is installed.

The external connection unit 225 may also include a port for a Universal Serial Bus device, for a memory card of various sizes (e.g., a memory stick, an SD card, a miniSD card, a microSD card, etc.), and the like. In that case, the external connection 225 may receive a memory card or other device having MP3 music files thereon such that the music may be supplied to the control unit 201 for distribution through the guidance indicator when implemented having audio capability. In that regard, the control unit 201 or the external connection unit 225 may be implemented with an MP3 player or otherwise provided with the ability to transmit the music through the guidance indicator. As another example, the external connection unit 225 may include a 3.5 mm, a ¼", or other type of jack to receive an audio signal, such as from an external MP3 player, a microphone, and the like. Again, the control unit 201 may be configured to provide any type of audio signal to the guidance indicator when implemented having audio capability and configured to control the playing of the audio signal. For example, the control unit 201 may include a master volume control for adjusting the volume of the audio signal supplied to the guidance indicator devices, may include dip switches to selectively provide the audio signal only to certain of the guidance indicator devices, etc.

The external connection unit 225 may also receive data from the control unit 201, such as report, status, failure or other data regarding any of the other components of the guidance indicator system 200 so as to store the received data on a memory card attached thereto.

The guidance indicator system 200 may include a single control unit 201 to control all floors or zones of a building, or a plurality of control units 201, for example a control unit 201 designated for each floor of a building. If implemented having a plurality of control units 201, each of the plurality of control units 201 may function independently or may function so as to transmit and receive power and/or control signals from any or all of the other control units 201 in order to provide a coordinated function of the guidance indicator system 200 for the building. In that case, the control units 201 may provide power and/or control signals through the external connection unit 225, either wirelessly or by a wired connection.

The guidance indicator system 200 may include a normal power source 203 and an emergency power source 205. In the illustrated embodiment, both the normal power source 203 and the emergency power source 205 are electrically connected to and are able to provide power to the control unit 201. Furthermore, the normal power source 203 and the emergency power source 205 are electrically connected to each other. As described above, the normal power source 203 and the emergency power source 205 may be provided from any of various sources. In an exemplary embodiment, the normal source of power 203 may be provided from a 120 Vac branch circuit from a distribution panel of the building in which the guidance indicator system 200 is located, which is ultimately provided electricity from a power company, and the emergency power source 205 may be a battery. As illustrated in FIG. 2, the normal power source 203 may be electrically connected to the emergency power source 205 so that, if the emergency power source 205 is implemented as a battery, the normal power source 203 may maintain the battery in a charged condition. In that exemplary implementation (i.e., if the normal power source 203 is an ac source of power), either the normal power source 203, the emergency power source 205, or both may include necessary circuitry to rectify and otherwise control the normal power source 203 to maintain the battery in a state of charge and to ensure a proper transition of power from the normal power source 203 to the emergency power source 205 if the normal source of power 203 is unavailable. Of course, these are merely examples and, as described above, the normal power source 203 and the emergency power source 205 may be implemented in any of a variety of ways.

In implementation, either or both of the normal power source 203 and the emergency power source 205 may include indicators as to their current state and the ability to provide the state information to the control unit 201. For example, if implemented as a battery, the emergency power source 205 may include an indicator as to the state of charge or remaining capacity of the battery, the battery voltage, and the like. Similarly, if implemented from a 120 Vac branch circuit, the normal power source 203 may include an indicator as to the available voltage at the normal power source 203. The above described indicators may be implemented using any audio or visual indication such as a meter, a light or a series of lights, a beeper, and the like. Also, either or both of the normal power source 203 and the emergency power source 205 may include the ability to test their functions. For example, if implemented as a battery, the emergency source of power 205 may include a push button and an associated indicator light that allows a user to determine any of various conditions such as a voltage or state of charge of a battery, and the like. Also, being provided the state information, the control unit 201 may provide the information to the external connection unit 225 for storage on a memory device, for transmission to an external device, and the like.

Pull station 207 is a device that allows an occupant to manually set off an alarm in the event of an emergency, such as a fire. As illustrated in FIG. 2, pull station 207 is electrically connected to control unit 201 in order to provide an indication of its activation. For example, upon activation, pull station 207 may transmit a signal to control unit 201, or provide a switch or contact that completes a circuit with control unit 201 in order to signify an emergency condition. Although only a single pull station 207 is illustrated in FIG. 2, the guidance indicator system 200 may include a plurality of pull stations 207, depending on the layout of the building as well as local laws, ordinances, etc. Moreover, the guidance indicator system 200 may be implemented such that the pull stations 207 are grouped or designated by zones in a manner similar to the grouping of detectors and guidance indicators as will be explained in more detail below.

The audio/visual alarm indication 209 provides either or both an audio alarm and a visual alarm in the event of an emergency. For example, the audio/visual alarm indication 209 may include a siren, a bell, a horn, and the like as well as a flashing light, a blinking light, a strobe light, and the like to indicate a state of emergency, such as a fire. In implementation, the audio/visual alarm indication 209 receives an input from the control unit 201 for activation. For example, in the event an occupant activates the pull station 207 or a detector (e.g., zone A detector #N, 215, etc.) detects an emergency condition, the control unit 201 would receive an indication of a state of emergency based on the activation of the pull station 207 and provide an activation signal to the audio/visual alarm indication 209. In implementation, the control unit 201 may provide one or both of a control signal and a power signal such that the audio/visual alarm indication 209 is activated. The function of the audio/visual alarm indication 209 may be considered distinct from that of the general guidance indicator 211 or any of the zone guidance indicators (217, 223) as it is provided to indicate a state of emergency without necessarily providing guidance information/indication.

General guidance indicator 211 may be provided a control signal and/or a power signal from control unit 201. In implementation, the general guidance indicator 211 can controlled by the control unit 201 to activate upon a loss of the normal power source 203, upon activation of the pull station 207, upon detection of an emergency condition by any of the detectors (e.g., zone A detector #N, 215, etc.), upon detection of a test condition, upon selection by a user (e.g., at the control unit 201, at an annunciator or other panel, or remotely), upon remote activation, and the like. As described above, the general guidance indicator 211 may be implemented in any of a variety of ways. For example, the general guidance indicator 211 may be implemented as a white light that illuminates a location that would otherwise be dark in the event of a loss of the normal power source 203. As another example, the general guidance indicator 211 may be implemented as a green arrow or other indication that directs an occupant towards an exit regardless of a detection of an emergency, or a location of a dangerous condition. Also, the general guidance indicator 211 may be implemented to be selectively activated. For example, if the guidance indicator system 200 is implemented having both the general guidance indicator 211 and the zone guidance indicators (217, 223), the general guidance indicator 211 may be activated only upon a loss of the normal power source 203, but not upon an emergency condition. As another example, the general guidance indicator 211 may be activated by a user selection or control.

The zone A detector #1 213, the zone A detector #N 215, the zone B detector #1 219, and the zone B detector #N 221 are each devices that detect a dangerous condition and may include a smoke detector, a fire detector, a carbon monoxide detector, and the like. The number of detectors (N) in a zone of a building (e.g., zone A) may vary depending on any of several parameters such as the size of the building, the layout of the building, the number of exits in the building, the number of other zones in the building, the proximity of other detectors, the number of detectors required by any ordinance, law, rule, etc., and the like. Furthermore, any or all zones of a building may be further configured as having sub-zones. For example, zone A may include a zone A1 and a zone A2. Moreover, although the variable N is used for both zones A and B, it is to be understood that there may be a different number of detectors in each zone of a building.

Upon occurrence of a dangerous condition in a zone, a detector located in that zone provides an indication of the dangerous condition to the control unit 201. For example, if a fire occurs in zone A, the zone A detector #1 213 may detect the fire and send an indication of the fire to the control unit 201. In that case, it may be assumed that a fire has not occurred in zone B such that the control unit 201 has not received an indication from any detector in zone B. As such, the control unit 201 is able to control the zone A guidance indicator 217 and the zone B guidance indicator 223 so as to guide or otherwise direct an occupant of the building away from zone A and towards an exit in zone B. As an example, the zone A guidance indicator 217 may be implemented so as to provide a red flashing light or to illuminate wording such as "NO EXIT" while the zone B guidance indicator 223 may be implemented so as to provide a green flashing light or to illuminate wording such as "EXIT HERE."

In the event that the control unit 201 receives an indication from each of a detector in zone A and a detector in zone B that a dangerous condition exists in both zones, the control unit 201 may control both the zone A guidance indicator 217 and the zone B guidance indicator 223 so as to provide a yellow flashing light or to illuminate wording such as "EXIT WITH CAUTION." Of course, these are merely examples of implementations of the guidance indicator and not to be construed as limiting. Moreover, while FIG. 2 illustrates only zones A and B, it is to be understood that the present invention is not limited to implementation with only two zones but may be implemented with any number of zones.

Furthermore, if a dangerous condition no longer exists, a detector having sensed the original dangerous condition may send a signal or open a contact or switch of a circuit to indicate to the control unit 201 that the dangerous condition no longer exists. In that case, the control unit 201 may alter the configurations of any or all of the general guidance indicator 211, the zone A guidance indicator 217, and the zone B guidance indicator 223.

Similar to the normal source of power 203 and the emergency source of power 205, the detectors 213, 215, 219 and 221 as well as the guidance indicators 217, 223, may include indicators as to their current state and the ability to provide the state information to the control unit 201. For example, the detectors may include indication as to their continuity with the control unit 201, indication regarding an internal or other fault, and the like. Similarly, the guidance indicator may include indication as to their continuity with the control unit 201, indication regarding the status of an LED, a speaker, etc. depending on the manner in which the guidance indicator is implemented, indication regarding an internal or other fault, and the like. And, being provided the state information, the control unit 201 may provide the information to the external connection unit 225 for storage on a memory device, for transmission to an external device, and the like FIG. 3 illustrates a component including a guidance indicator according to an exemplary embodiment of the present invention.

Figure 3:
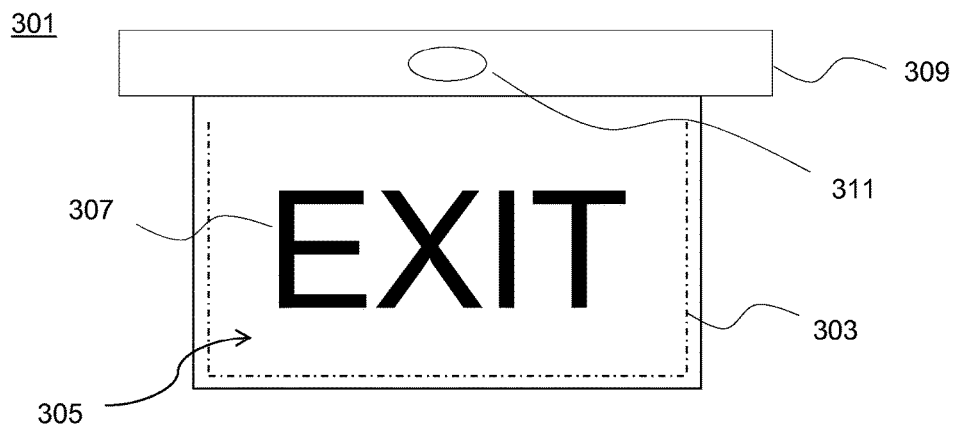
FIG. 3 illustrates a component including a guidance indicator according to an exemplary embodiment of the present invention.

Referring to FIG. 3, an exit sign 301 is provided as an example of a component that includes a guidance indicator 303. In the embodiment of FIG. 3, the guidance indicator 303 is illustrated as a plurality of LEDs arranged near the bottom and side perimeters of a face 305 of the exit sign 301. The face 305 may be a clear casing having lettering 307 contained therein. In the illustrated example, the guidance indicator 303 is an integral part of the exit sign 301 in that it is also located within the casing of the face 305. The exit sign 301 also includes a bracket 309 provided for mounting the exit sign 301 and for containing and concealing wiring, electronics, and the like that are necessary for power and control of the exit sign 301 and the guidance indicator 303. For example, the bracket 309 includes a speaker 311 mounted thereon.

In the embodiment illustrated in FIG. 3, both the lettering 307 and the guidance indicator 303 may be implemented using LEDs. In that case, when implemented with a centrally located control unit, such as the control unit 201 of FIG. 2, the exit sign 301 would not require an integrated backup power supply, such as a battery. This is because, as described with reference to FIG. 2, the control unit includes both a normal power source and an emergency power source that are fed to the exit sign 301. As such, the exit sign 301 is provided with both normal power and emergency power from the control unit in order to illuminate either or both the lettering 307 and the guidance indicator 303 as conditions necessitate. With the elimination of an integrated backup power supply, the costs of manufacturing the exit sign 301 as well as the maintenance costs (e.g., internal battery replacement, etc.) are reduced.

As also described above, the exit sign 301, in conjunction with the guidance indicator 303, may be configured so as to display a first indication on a front side and display a second indication, distinct from the first indication, on a back side. For example, if the exit sign 301 is located between two exit points, one of which is preferred over the other, the front side of the exit sign 301 may display a different indication than that displayed on the back side such that building occupants are directed to the preferred exit, and away from the other exit. In implementation, the face 305 may be configured with guidance indicator 303 on each of the front side and the back side and having an optically opaque layer between them, or be provided with another means (e.g., a layer of liquid crystal, etc.) by which to optically distinguish the display on the front side from the display on the back side. Additionally, the exit sign 301 may be configured so as to adapt to various installations. For example, the bracket 309 of the exit sign 301 may rotate and/or click into a position so as to face any direction desired by a user. Additionally, the exit sign 301 may be configured to receive another guidance indicator device depending on the specifics of the location in which it is installed. For example, if the exit sign 301 is mounted in a corner of a hallway, an occupant may be able to see the exit sign 301 when heading north/south but be unable to see the exit sign 301 when turning the corner and heading east/west. In that case, it would be advantageous to allow the exit sign 301 to rotate such that it may be viewed in all directions, or to allow the exit sign 301, for example by means of the bracket 309, to connect with another exit sign so as to provide an indication in all directions. If configured for connection with another exit sign, both exit signs may be provided with appropriate connectors for power and/or control signals.

The speaker 311 may be provided as a guidance indicator. As described above, the speaker 311 may receive a signal from a control unit, such as control unit 201 illustrated in FIG. 2, so as to provide an indication to an occupant as to a path for egress. Further, based on the connection to the control unit, the speaker 311 may receive any audio signal, such as music, a voice, and the like. Although not illustrated, the exit sign 301 may include a volume control for the speaker 311. Additionally, although not illustrated, the exit sign 301, or any guidance indicator in general, may include indicators regarding the status of the guidance indicator. For example, the exit sign 301 may include indication regarding the status of the LEDs 303, the status of a connection to a control unit, and the like. Moreover, the exit sign 301 may include the ability to test any or all of its functions and include indication as to the test results. For example, the exit sign 301 may include a test button and indicator light to determine the availability of an emergency power source. The exit sign 301 may also include the ability to test the function of the LEDs 303, such as by a test button that controls power to the LEDs to ensure they illuminate. Additionally, results of any of the status information and the results of any testing may be provided to a control unit. Of course, these are all merely examples of status indicators and tests.

Again, the exit sign 301 is provided in FIG. 3 merely as an example of a guidance indicator. In implementation, the guidance indicator may be provided having any of various forms, such as a component similar to the exit sign 301 but without the "EXIT" lettering. For example, the guidance indicator may include a device that illuminates an arrow, a circle with an "X", or other indication upon receipt of a control signal from a control unit. Additionally, the guidance indicator may include a speaker, such as speaker 311, a motion detector, indicators regarding a status of the guidance indicator, and the like.

The above described configuration is envisioned for use in a new installation or component replacement. However, as described above, the guidance indicator 303 may also be implemented with an existing component, device, or apparatus of a building. For example, the exit sign 301 may be one that is currently located in a building and not provided with guidance indicator. In that case, the guidance indicator 303 may be implemented as an attachment to an existing exit sign 301. For example, rather than a single face 305 having a clear casing, the exit sign 301 may include a front face and a back face separated by a body, each face having the word "EXIT" written thereon, a source of internal light to illuminate the word "EXIT," and an integrated backup power supply. In that case, the guidance indicator 303 may be implemented as part of a replacement for one or preferably both of the front face and the back face. As such, the replacement for either the front face or the back face may include the word "EXIT" along with the guidance indicator 303, each implemented using LEDs, such that the internal light and the existing integrated backup power supply may be eliminated. In this case, maintenance costs are again reduced. Furthermore, either or both replacement face may slide on, clip on, screw on, or otherwise attach to an existing exit sign. As another example, the exit sign 301 including the guidance indicator 303 may be implemented as illustrated in FIG. 3 wherein the face 305 is provided as a replacement for an existing exit sign and an existing bracket is continued to be used. In that case, the new face 305 may slide into the existing bracket while various internal components of the existing bracket (i.e., internal battery, etc.) may be disposed.

Of course, the above are merely examples of ways in which the guidance indicator 303 may be implemented with an existing component. For example, while it was described that the guidance indicator 303 may be part of a replacement face, the guidance indicator instead could be attached to an existing component by any of various attachment means such as a clamp, a screw, a compression, a spring, and the like. Also, while the guidance indicator 303 is illustrated in FIG. 3 as a plurality of LEDs, this is also merely an example. In implementation, guidance indicator 303 may be provided as any number of components (e.g., LEDs, etc.) that clamp on, screw on, or otherwise attach to an existing component, such as exit sign 301. For example, guidance indicator 303 may comprise three LEDs, one each of red, green and yellow, that are coupled to an existing component.

Furthermore, although not illustrated, the guidance indicator, such as exit sign 301, may be configured to include components to ensure its proper function. For example, the exit sign 301 may include components and circuitry, such as a push button or other switch, a meter, a light, etc., to test the guidance indicator 303, to test the availability of emergency power at the exit sign 301, and the like. Also, the components may include necessary circuitry such that the testing may be performed remotely.

As described above, the guidance indicator 303 may include red, green and yellow LEDs that are controlled to illuminate upon certain conditions. For example, depending on the location of the exit sign 301, the guidance indicator 303 may be controlled to flash the green LEDs to signify a safe or desired path for egress, to flash the red LEDs to signify a dangerous path, and to flash the yellow LEDs to signify a general warning state. Also, the wording 307 may be controlled by the control unit so as to extinguish as desired, such as during an emergency. Also, as an example, the guidance indicator 303 may be implemented as an arrow that flashes on an appropriate side of the exit sign 301 depending on a control signal received from a control unit.

Figure 4:
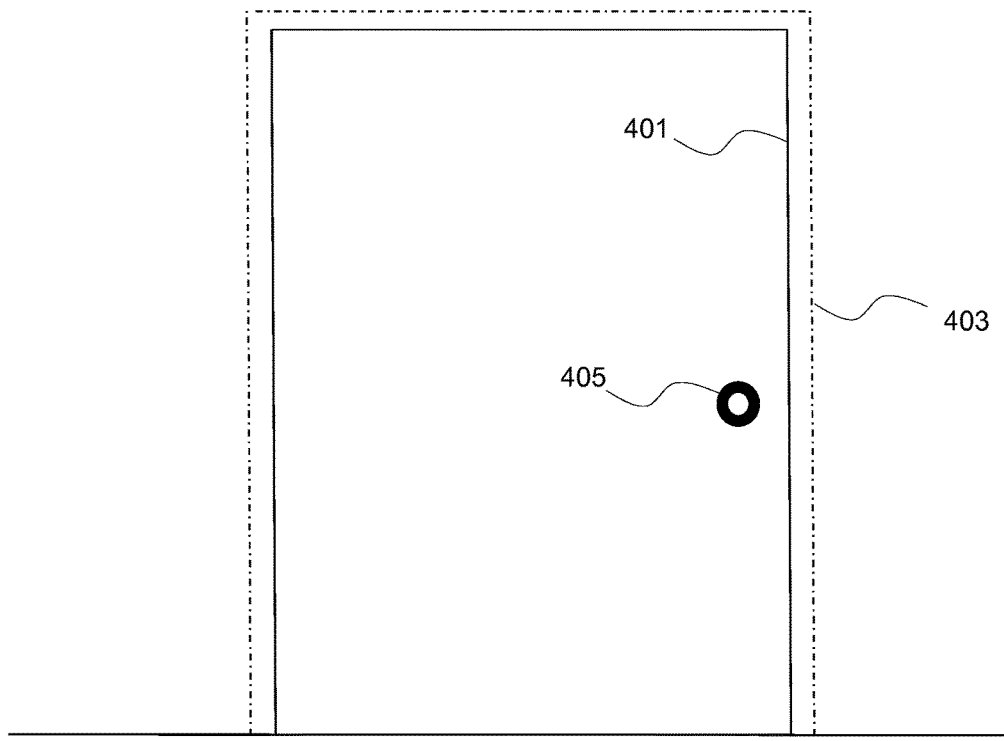
FIG. 4 illustrates a component including guidance indicator according to an exemplary embodiment of the present invention.

FIG. 4 illustrates a component including a guidance indicator according to an exemplary embodiment of the present invention.

Referring to FIG. 4, guidance indicator 403 may be implemented as an attachment to a frame of a door 401. In the example of FIG. 4, it is assumed that the door 401 leads to a stairwell or other exit point. In that case, depending on a location of a dangerous condition, the guidance indicator 403 may be controlled to indicate to an occupant that the door 401 should be used or should be avoided. That is, the guidance indicator 403 may be controlled to signify a safe or an unsafe path for exit. More specifically, the guidance indicator 403 may be implemented with green, red, and yellow LEDs and be controlled in a manner similar to that described above, such as with reference to FIG. 3. Door 401 may also include a door knob 405. Door knob 405 may also be configured with guidance indicator in that the door knob 405 may include LEDs of various colors and be controlled to signify that the door 401 is considered a safe or unsafe path for egress.

While the guidance indicator 403 is illustrated in FIG. 4 as a continuous row of LEDs, this is only an example. In implementation, the guidance indicator 403 may be installed as a continuous strip of LEDs, or may be installed as three separate parts (i.e., parts on the top and both sides of the door frame) that are connectable to each other. In that case, each part of the guidance indicator 403 may include an interlocking means to ensure proper connection. Moreover, the guidance indicator 403 may be implemented so as to be cut or otherwise re-configured to achieve a specific size depending on the installation environment (e.g., height or width of door frame, diameter of doorknob, etc.) and may be provided having a guard (e.g., a plexiglas cover, etc.) to avoid damage.

While the invention has been shown and described with reference to certain exemplary embodiments thereof, it will be understood by those skilled in the art that various changes in form and details may be made therein without departing from the spirit and scope of the invention.

What is claimed is:

1. A guidance system for directing safe egress from a building comprising:
    at least one exit sign, each exit sign having at least one first guidance indicator, each exit sign being disposed at select locations within the building;
    at least one second guidance indicator located only at each egress within the building, each at least one second guidance indicator selectively activated to illuminate distinct indicia indicating a corresponding distinct predefined condition, the predefined condition being selected from a group consisting of safe, dangerous, and caution;
    at least one third guidance indicator disposed at select locations within the building,
    each of the first, second and third guidance indicators having indicia thereon for directing traffic towards a calculated safe egress, at least each of the first, second and third guidance indicators being coupled to a primary power source;
    at least one sensor disposed at select locations within the building, the at least one sensor detecting a predefined dangerous condition;
    a secondary power source coupled to each of the first, second and third guidance indicators, the secondary power source selectively providing secondary power upon failure of the primary power source; and
    a control communicating with each of the first, second and third guidance indicators and the at least one sensor, the control determining a crisis state and a sensed dangerous location based on the predefined dangerous condition sensed by the at least one sensor, the control calculating a safe route within the building based upon the sensed dangerous location towards the calculated safe egress, and illuminating the distinct safe indicia of one of the at least one second guidance indicator and illuminating the distinct dangerous indicia of another of the at least one second guidance indicator in accordance with the calculated safe route thereby directing traffic away from the sensed dangerous location, wherein when the control further calculates all egress as dangerous, the control automatically illuminates the same distinct caution indicia at each of the second guidance indicators.

2. The guidance system for directing safe egress according to claim 1, wherein each said at least one exit sign comprises a replacement exit sign for existing exit signs within said building.

3. The guidance system for directing safe egress according to claim 1, wherein the distinct indicia indicating the safe, dangerous, and caution predefined conditions are green, red, and yellow colored light sources, respectively.

4. The guidance system for directing safe egress according to claim 3, wherein said colored light sources comprise an LED.

5. The guidance system for directing safe egress according to claim 1, wherein each said at least one third guidance indicator comprises an illuminated indicia to indicate direction to follow, condition, or state with respect to a predetermined immediate area around said third guidance indicator.

6. The guidance system for directing safe egress according to claim 5, wherein each said at least one third guidance indicator comprises a colored light source.

7. The guidance system for directing safe egress according to claim 1, wherein each said at least one sensor comprises a sensor selected from a group consisting of a harmful gas sensor, heat sensor, smoke sensor, and audio sensor.

8. The guidance system for directing safe egress according to claim 7, wherein said audio sensor comprises a mic to detect sounds indicative of gunshots and explosions.

9. The guidance system for directing safe egress according to claim 1, further comprising at least one speaker coupled to each at least one exit sign, said at least one speaker facilitating audible alarms, announcements, and other sounds during the crisis.

10. The guidance system for directing safe egress according to claim 1, wherein said at least one second guidance indicator comprises a colored light source, said colored light source illuminating indicia for a safe exit.

11. The guidance system for directing safe egress according to claim 1, wherein each of said first, second and third guidance indicators are in effective communication with said control regarding their respective operational status.

12. A method for directing traffic towards a safe egress during times of crisis comprising the steps of:
  providing a guidance system comprising;
    a) at least one exit sign, each exit sign having at least one first guidance indicator, each exit sign being disposed at select locations within a building;
    b) at least one second guidance indicator located only at each egress within the building, each at least one second guidance indicator selectively activated to illuminate distinct indicia indicating a corresponding distinct predefined condition, the predefined condition being selected from a group consisting of safe, dangerous, and caution;
    c) at least one third guidance indicator disposed at select locations within the building;
    d) each of the first, second and third guidance indicators having indicia thereon for directing traffic towards a calculated safe egress, at least each of the first, second and third guidance indicators being coupled to a primary power source;
    e) at least one sensor disposed at select locations within the building, the at least one sensor detecting a predefined dangerous condition;
    f) a secondary power source coupled to the guidance indicators, the secondary power source selectively providing power upon failure of the primary power source; and
    g) a control communicating with each of the first, second and third guidance indicators and the at least one sensor, the control determining a crisis state and a sensed dangerous location based on the predefined dangerous condition sensed by the at least one sensor, the control calculating:
      i) a safe route within the building based upon the sensed dangerous location towards the calculated safe egress, and illuminating the distinct safe indicia of one of the at least one second guidance indicator and illuminating the distinct dangerous indicia of another of the at least one second guidance indicator in accordance with the calculated safe route thereby directing traffic away from the sensed dangerous location; and
      ii) when the control further calculates all egress as dangerous, the control automatically illuminates the same distinct caution indicia at each of the second guidance indicators;
  detecting existence of the predefined dangerous condition with the at least one sensor;
  determining a crisis state based on the predefined dangerous condition sensed by the at least one sensor;
  calculating a safe route within the building based upon the sensed dangerous location towards the safe egress;
  activating the distinct safe indicia of one of the at least one second guidance indicator in accordance with the calculated safe route to direct traffic away from dangerous areas within the building towards the safe egress;
  calculating a dangerous route within the building based upon the sensed dangerous location;
  activating the distinct dangerous indicia of another of the at least one second guidance indicator in accordance with the calculated dangerous route to direct traffic away from dangerous areas within the building towards the safe egress; and
  determining when all egress is calculated as dangerous to automatically illuminate the distinct caution indicia at each of the second guidance indicators.

13. The method for directing traffic towards a safe egress during times of crisis according to claim 12, wherein said at least one exit sign comprises the step of providing a replacement exit sign for existing exit signs within said building.

14. The method for directing traffic towards a safe egress during times of crisis according to claim 12, wherein the distinct indicia indicating the safe, dangerous, and caution predefined conditions are green, red, and yellow colored light sources, respectively.

15. The method for directing traffic towards a safe egress during times of crisis according to claim 12, wherein said step of providing a guidance system comprises the step of providing an illuminated indicia to each said at least one third guidance indicator, said illuminated indicia indicating direction to follow, condition, or state with respect to a predetermined immediate area around said third guidance indicator.

16. The method for directing traffic towards a safe egress during times of crisis according to claim 12, wherein each said at least one sensor comprises the step of providing a sensor selected from a group consisting of a harmful gas sensor, heat sensor, smoke sensor, and audio sensor.

17. The method for directing traffic towards a safe egress during times of crisis according to claim 16, further comprising the step of detecting sounds indicative of gunshots and explosions.

18. The method for directing traffic towards a safe egress during times of crisis according to claim 12, further comprising the steps of:
  providing at least one speaker coupled to each at least one exit sign; and sounding audible alarms, announcements, and other sounds during the crisis.

* * * * *